US009294002B2

(12) United States Patent
Okuma

(10) Patent No.: US 9,294,002 B2
(45) Date of Patent: Mar. 22, 2016

(54) POWER SUPPLY CIRCUIT WITH REDUCED OUTPUT VOLTAGE OSCILLATION

(71) Applicant: Hitachi, Ltd., Chiyoda-ku, Tokyo (JP)

(72) Inventor: Yasuyuki Okuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 14/301,774

(22) Filed: Jun. 11, 2014

(65) Prior Publication Data

US 2014/0361758 A1   Dec. 11, 2014

(30) Foreign Application Priority Data

Jun. 11, 2013 (JP) ................................. 2013-122393

(51) Int. Cl.
*H02M 5/293* (2006.01)
*G05F 1/563* (2006.01)
*G05F 1/59* (2006.01)

(52) U.S. Cl.
CPC ............... *H02M 5/293* (2013.01); *G05F 1/563* (2013.01); *G05F 1/59* (2013.01); *H02M 2005/2932* (2013.01)

(58) Field of Classification Search
CPC ..................... H02M 2001/0045; H02M 5/293; H02M 2005/2932; G05F 1/00; G05F 1/56
See application file for complete search history.

(56) References Cited

U.S. PATENT DOCUMENTS

| 6,661,211 | B1* | 12/2003 | Currelly et al. | 323/268 |
| 7,058,373 | B2* | 6/2006 | Grigore | 455/127.1 |
| 7,167,054 | B1* | 1/2007 | Dening et al. | 330/297 |
| 7,679,433 | B1* | 3/2010 | Li | 330/10 |
| 7,701,690 | B1* | 4/2010 | Li et al. | 361/159 |
| 2002/0121882 | A1* | 9/2002 | Matsuo et al. | 323/266 |
| 2003/0137286 | A1* | 7/2003 | Kimball et al. | 323/271 |
| 2005/0189931 | A1* | 9/2005 | Ishino | 323/282 |
| 2006/0028188 | A1* | 2/2006 | Hartular et al. | 323/273 |
| 2007/0247124 | A1* | 10/2007 | Mihashi | 323/224 |
| 2007/0252564 | A1* | 11/2007 | De Nisi et al. | 323/268 |
| 2009/0072626 | A1* | 3/2009 | Watanabe et al. | 307/85 |
| 2009/0191826 | A1* | 7/2009 | Takinami et al. | 455/110 |
| 2010/0244951 | A1* | 9/2010 | Smith | 330/127 |
| 2012/0062192 | A1* | 3/2012 | Okuma | 323/272 |

FOREIGN PATENT DOCUMENTS

JP    2012-063810 A    3/2012

* cited by examiner

*Primary Examiner* — Timothy J Dole
*Assistant Examiner* — Yusef Ahmed
(74) *Attorney, Agent, or Firm* — Miles & Stockbridge P.C.

(57) ABSTRACT

A power supply circuit has: an input terminal; an output terminal; and a digital power supply circuit and an analog power supply circuit connected in parallel between the input terminal and the output terminal. Further desirably, the analog power supply circuit is a circuit that the minimum resistance value of an output equivalent resistance between an input terminal and an output terminal of the analog power supply circuit is an output equivalent resistance equal to or lower than the minimum ON resistance among those of switch circuits configuring the switch array unit of the digital power supply circuit and having a plurality of ON resistances, or a circuit that the minimum resistance value is an output equivalent resistance equal to or lower than the minimum resistance value among those of switch circuits configuring the switch array unit of the digital power supply circuit and having series-connected resistances having resistance values.

3 Claims, 8 Drawing Sheets

FIG. 2

| TIME: CLOCK CYCLE T | $T_{n-3}$ | $T_{n-2}$ | $T_{n-1}$ | $T_n$ | $T_{n+1}$ | $T_{n+2}$ | $T_{n+3}$ | $T_{n+4}$ | $T_{n+5}$ | $T_{n+6}$ | $T_{n+7}$ | $T_{n+8}$ | $T_{n+9}$ | $T_{n+10}$ |
|---|---|---|---|---|---|---|---|---|---|---|---|---|---|---|
| NUMBER OF ON SWITCHES: Ns | m-3 | m-2 | m-1 | m | m+1 | m+2 | m+1 | m | m-1 | m | m+1 | m+2 | m+1 | m |
| DIGITAL $1/RS$ | $\frac{m-3}{R_{sw}}$ | $\frac{m-2}{R_{sw}}$ | $\frac{m-1}{R_{sw}}$ | $\frac{m}{R_{sw}}$ | $\frac{m+1}{R_{sw}}$ | $\frac{m+2}{R_{sw}}$ | $\frac{m+1}{R_{sw}}$ | $\frac{m}{R_{sw}}$ | $\frac{m-1}{R_{sw}}$ | $\frac{m}{R_{sw}}$ | $\frac{m+1}{R_{sw}}$ | $\frac{m+2}{R_{sw}}$ | $\frac{m+1}{R_{sw}}$ | $\frac{m}{R_{sw}}$ |
| ANALOG $1/R_A$ | $\frac{2}{R_c}$ | $\frac{2}{R_c}$ | $\frac{1}{R_c}+\frac{1}{R_c}$ | $\frac{1}{R_c}$ | 0 | 0 | 0 | $\frac{1}{R_c}$ | $\frac{1}{R_c}+\frac{1}{R_c}$ | $\frac{1}{R_c}$ | 0 | 0 | 0 | $\frac{1}{R_c}$ |
| TOTAL $1/R_T$ | $\frac{m-1}{R_{sw}}$ | $\frac{m}{R_{sw}}$ | $\frac{m-1}{R_{sw}}+\frac{1}{R_c}$ | $\frac{m+1}{R_{sw}}+\frac{1}{R_c}$ | $\frac{m+1}{R_{sw}}$ | $\frac{m+2}{R_{sw}}$ | $\frac{m+1}{R_{sw}}$ | $\frac{m+1}{R_{sw}}+\frac{1}{R_c}$ | $\frac{m-1}{R_{sw}}+\frac{1}{R_c}$ | $\frac{m+1}{R_{sw}}+\frac{1}{R_c}$ | $\frac{m+1}{R_{sw}}$ | $\frac{m+2}{R_{sw}}$ | $\frac{m+2}{R_{sw}}$ | $\frac{m}{R_{sw}}+\frac{1}{R_c}$ |
| OUTPUT VOLTAGE | $\frac{R_L \cdot V_{dd}}{R_L+RS_{sw}}$ | $\frac{R_L \cdot V_{dd}}{R_L+RS_{sw}}$ | $V_{ss}$ | $V_{ss}$ | $\frac{R_L \cdot V_{dd}}{R_L+RS_{sw}}$ | $\frac{R_L \cdot V_{dd}}{R_L+RS_{sw}}$ | $\frac{R_L \cdot V_{dd}}{R_L+RS_{sw}}$ | $V_{ss}$ | $V_{ss}$ | $V_{ss}$ | $\frac{R_L \cdot V_{dd}}{R_L+RS_{sw}}$ | $\frac{R_L \cdot V_{dd}}{R_L+RS_{sw}}$ | $\frac{R_L \cdot V_{dd}}{R_L+RS_{sw}}$ | $V_{ss}$ |
| Comp_out (i.V.Vop1=Vref, H:V.Vop1<V.ref) | L | L | L | L | H | H | H | L | L | L | H | H | H | L |
| INCREASE/DECREASE IN NUMBER OF SWITCHES | INCREASE | INCREASE | INCREASE | INCREASE | INCREASE | DECREASE | DECREASE | DECREASE | INCREASE | INCREASE | INCREASE | DECREASE | DECREASE | DECREASE |

| TIME: CLOCK CYCLE T | $T_{n-3}$ | $T_{n-2}$ | $T_{n-1}$ | $T_n$ | $T_{n+1}$ | $T_{n+2}$ | $T_{n+3}$ |
|---|---|---|---|---|---|---|---|
| NUMBER OF ON SWITCHES: Ns | m-3 | m-2 | m-1 | m | m+1 | m | m+1 |
| DIGITAL 1/RS | $\frac{m-3}{R_{sv}}$ | $\frac{m-2}{R_{sv}}$ | $\frac{m-1}{R_{sv}}$ | $\frac{m}{R_{sv}}$ | $\frac{m+1}{R_{sv}}$ | $\frac{m}{R_{sv}}$ | $\frac{m+1}{R_{sv}}$ |
| OUTPUT VOLTAGE | $\frac{R \cdot V_{in}}{R + RS_{sv}}$ | $\frac{R \cdot V_{in}}{R + RS_{sv}}$ | $\frac{R \cdot V_{in}}{R + RS_{sv}}$ | $\frac{R \cdot V_{in}}{R + RS_{sv}}$ | $\frac{R \cdot V_{in}}{R + RS_{sv}}$ | $\frac{R \cdot V_{in}}{R + RS_{sv}}$ | $\frac{R \cdot V_{in}}{R + RS_{sv}}$ |
| Comp_out (L:V$_{out}$<V$_{ref}$; H:V$_{out}$<V$_{ref}$) | L | L | L | L | H | L | H |
| INCREASE/DECREASE IN NUMBER OF SWITCHES | ○ | ○ | ○ | ○ | ○ | ○ | ○ |

INCREASE  INCREASE  INCREASE  INCREASE  DECREASE  INCREASE
INCREASE  INCREASE (RELATED ART)

FIG. 5

| TIME: CLOCK CYCLE T | $T_{n-(K+2)}$ | $T_{n-(K+1)}$ | $T_{n-K}$ | $T_{n-(K-1)}$ | $T_{n-(K-2)}$ | ... | $T_{n-2}$ | $T_{n-1}$ | $T_n$ | $T_{n+1}$ | $T_{n+2}$ | $T_{n+3}$ | $T_{n+4}$ | $T_{n+5}$ |
|---|---|---|---|---|---|---|---|---|---|---|---|---|---|---|
| NUMBER OF ON SWITCHES: Ns | m-(K+2) | m-(K+1) | m-K | m-(K-1) | m-(K-2) | ... | m-2 | m-1 | m | m+1 | m | m+1 | m | m-1 |
| DIGITAL 1/RS | $\frac{m-(K+2)}{R_{ON}}$ | $\frac{m-(K+1)}{R_{ON}}$ | $\frac{m-K}{R_{ON}}$ | $\frac{m-(K-1)}{R_{ON}}$ | $\frac{m-(K-2)}{R_{ON}}$ | ... | $\frac{m-2}{R_{ON}}$ | $\frac{m-1}{R_{ON}}$ | $\frac{m}{R_{ON}}$ | $\frac{m+1}{R_{ON}}$ | $\frac{m}{R_{ON}}$ | $\frac{m+1}{R_{ON}}$ | $\frac{m}{R_{ON}}$ | $\frac{m-1}{R_{ON}}$ |
| ANALOG 1/RA | $\frac{K}{R_C}$ | $\frac{K-1}{R_C}$ | $\frac{K}{R_C}$ | $\frac{K-1}{R_C}$ | $\frac{K-2}{R_C}$ | ... | $\frac{2}{R_C}$ | $\frac{1}{R_C}$ | $\frac{1}{R_C}$ | 0 | $\frac{1}{R_C}$ | 0 | $\frac{1}{R_C}$ | 0 |
| TOTAL 1/RT | $\frac{m-2}{R_{ON}}+\frac{K}{R_C}$ | $\frac{m-1}{R_{ON}}+\frac{K-1}{R_C}$ | $\frac{m}{R_{ON}}+\frac{1}{R_C}$ | $\frac{m-1}{R_{ON}}+\frac{1}{R_C}$ | $\frac{m}{R_{ON}}+\frac{1}{R_C}$ | ... | $\frac{m}{R_{ON}}+\frac{1}{R_C}$ | $\frac{m-1}{R_{ON}}+\frac{1}{R_C}$ | $\frac{m}{R_{ON}}+\frac{1}{R_C}$ | $\frac{m+1}{R_{ON}}$ | $\frac{m}{R_{ON}}+\frac{1}{R_C}$ | $\frac{m+1}{R_{ON}}$ | $\frac{m}{R_{ON}}+\frac{1}{R_C}$ | $\frac{m+1}{R_{ON}}$ |
| OUTPUT VOLTAGE | $\frac{R_L \cdot V_{IN}}{R_L + RS_{n-1}}$ | $\frac{R_L \cdot V_{IN}}{R_L + RS_{n-1}}$ | $V_{REF}$ | $V_{REF}$ | $V_{REF}$ | ... | $V_{REF}$ | $V_{REF}$ | $V_{REF}$ | $\frac{R_L \cdot V_{IN}}{R_L + RS_{n-1}}$ | $V_{REF}$ | $\frac{R_L \cdot V_{IN}}{R_L + RS_{n-1}}$ | $V_{REF}$ | $\frac{R_L \cdot V_{IN}}{R_L + RS_{n-1}}$ |
| Comp_out (L:V(OUT)>V(REF), H:V(OUT)<V(REF)) | L | L | L | L | L | ... | L | L | L | H | L | H | L | H |
| INCREASE/DECREASE IN NUMBER OF SWITCHES | INCREASE | INCREASE | INCREASE | INCREASE | INCREASE | ... | INCREASE | INCREASE | INCREASE | DECREASE | INCREASE | DECREASE | INCREASE | DECREASE |

FIG. 8

| TIME: CLOCK CYCLE T | $T_{n-3}$ | $T_{n-2}$ | $T_{n-1}$ | $T_n$ | $T_{n+1}$ | $T_{n+2}$ | $T_{n+3}$ | $T_{n+4}$ | $T_{n+5}$ | $T_{n+6}$ | $T_{n+7}$ | $T_{n+8}$ | $T_{n+9}$ | $T_{n+10}$ |
|---|---|---|---|---|---|---|---|---|---|---|---|---|---|---|
| NUMBER OF ON SWITCHES: Ns | m-3 | m-2 | m-1 | m | m+1 | m+2 | m+1 | m | m-1 | m | m-1 | m-2 | m+1 | m |
| DIGITAL 1/PS | $\frac{m-3}{R_{on}}$ | $\frac{m-2}{R_{on}}$ | $\frac{m-1}{R_{on}}$ | $\frac{m}{R_{on}}$ | $\frac{m+1}{R_{on}}$ | $\frac{m+2}{R_{on}}$ | $\frac{m+1}{R_{on}}$ | $\frac{m}{R_{on}}$ | $\frac{m-1}{R_{on}}$ | $\frac{m}{R_{on}}$ | $\frac{m-1}{R_{on}}$ | $\frac{m-2}{R_{on}}$ | $\frac{m+1}{R_{on}}$ | $\frac{m}{R_{on}}$ |
| OUTPUT VOLTAGE | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ | $\frac{R_L \cdot V_{in}}{R_L + RS_n}$ |
| Comp. out ($V_{ref}$>V_{out}$:H, R_{ref}$<V_{out}$:L) | L | L | L | L | H | H | H | L | L | L | H | H | H | L |
| INCREASE/DECREASE IN NUMBER OF SWITCHES | INCREASE | INCREASE | INCREASE | INCREASE | INCREASE | INCREASE | DECREASE | DECREASE | DECREASE | INCREASE | INCREASE | INCREASE | DECREASE | DECREASE |

*(RELATED ART)*

US 9,294,002 B2

POWER SUPPLY CIRCUIT WITH REDUCED OUTPUT VOLTAGE OSCILLATION

CROSS-REFERENCE TO RELATED APPLICATION

The present application claims priority from Japanese Patent Application No. 2013-122393 filed on Jun. 11, 2013, the content of which is hereby incorporated by reference into this application.

TECHNICAL FIELD OF THE INVENTION

The present invention relates to a power supply circuit that converts an input voltage to a desired output voltage based on a reference voltage.

BACKGROUND OF THE INVENTION

In recent years, an operating voltage of a semiconductor circuit has been reduced along with miniaturization, and a digital circuit can be operated at 1.0 V or lower. Moreover, in the digital circuit, power consumption in the operation of the circuit can be reduced by reducing a power supply voltage or an operating speed. Because of such a background, utilization of the circuit for an energy harvesting system such as a solar cell has been paid attention. As a power supply adjusted to such an energy harvesting system, a digitally-controlled power supply has been paid attention.

As a conventional technique, for example, the power supply circuit illustrated in FIG. 1 of Japanese Patent Application Laid-Open Publication No. 2012-63810 (Patent Document 1) which has been previously applied by the present inventor is known.

SUMMARY OF THE INVENTION

The power supply circuit of the conventional technique described in FIG. 1 of the above-described Patent Document 1 will be explained by using FIG. 6. A power supply circuit illustrated in FIG. 6 is configured of: an input terminal 301; an output terminal 302; a switch array unit 304 formed of a plurality of switches 303; a comparison circuit 305; a control unit 309 including a switch-state register 306, a change-value register 307, and a history storage register 308; a clock terminal 310; a reference-voltage terminal 313; a smooth capacity 315; and others.

The comparison circuit 305 compares a reference voltage which is input to the reference-voltage terminal 313 with a feedback voltage 312 which is generated from an output voltage of the output terminal 302, and outputs a comparison result signal 314 of a digital value. The control unit 309 is configured of a digital logic circuit, updates a value of the switch-state register 306 in accordance with the comparison result signal 314 and a clock signal inputted to the clock terminal 310, and outputs a switch control signal 311 of a digital value in accordance with this switch-state register 306. By this switch control signal 311 of the digital value, the number of the ON-state switches or the number of the OFF-state switches of the switch array unit 304 formed of the plurality of switches 303 connected in parallel to each other between the input terminal 301 and the output terminal 302 is changed so as to control the output voltage to be a desired voltage. In this manner, the desired output voltage is obtained from the output terminal 302.

The above-described power supply circuit illustrated in FIG. 6 is a digital power supply circuit, and the comparison circuit 305 is also an all-digitally-controlled power supply circuit utilizing a clocked comparator in a digital circuit operation.

When an input voltage from the input terminal 301 is expressed as "$V_{IN}$", an output voltage "$V_{OUT}$" from the output terminal 302 of the digital power supply circuit has a relation as expressed by Expression (1) including an equivalent resistance "RS" of the switch array unit 304 and a resistance "$R_L$" of a load connected to the output terminal 302 of the digital power supply circuit.

$$V_{OUT} = (R_L/(R_L+RS))V_{IN} \quad (1)$$

Moreover, in the digital power supply circuit, when the equivalent resistance RS is expressed as "RSm" when the number of the ON-state switches of the switch array unit 304 is expressed as "m", a relation between the number m of the ON-state switches and the equivalent resistance RSm is expressed by Expression (2), and the control of the output voltage is achieved by changing the equivalent resistance RS by updating the number m of the ON-state switches.

$$RSm = R_{ON}/m \quad (2)$$

However, in the following explanation, in order to aid the understanding of a principle, it is assumed that all the switches 303 of the switch array unit 304 have the same characteristics as each other, an ON resistance of one switch is expressed as "$R_{ON}$", and the switches are ideally opened in the OFF state. As a matter of course, the Expression (2) can be also expressed by a form in consideration of the OFF resistance of the OFF-state switch.

However, the digital circuit generally causes a delay until the output signal is changed by change of the input signal. For example, as a general digital circuit in the power supply circuit of FIG. 6, a configuration including the comparison circuit 305, the control unit 309, and the switch array unit 304 as illustrated in FIG. 7 is considered. In FIG. 7, note that the components are denoted by the same symbols as corresponding to FIG. 6.

If a clock-synchronization-type digital circuit is used for the control unit 309, data retention circuits (latch circuits) are prepared for input/output of signals, and values of an input-side data retention circuit and an output-side data retention circuit are updated by a clock. Therefore, a delay in a unit of a clock cycle is caused until data change on the input side is reflected to data change on the output side.

When the clock signal is inputted at every time "T", in an operation of a steady state, a reference voltage "$V_{REF}$" and an output voltage "$V_{OUT}$" (feedback voltage) are compared with each other by the comparison circuit 305, and a comparison result signal "Comp_out" is determined at time "Tn".

The input-side data retention circuit of the control unit 309 retrieves the comparison result signal Comp_out at time $T_{n+1}$, and the output of the logic circuit is determined. Then, at time $T_{n+2}$, the output-side data retention circuit of the control unit 309 retrieves the output of the logic circuit determined at the time $T_{n+1}$, a signal which controls the ON/OFF state of each switch of the switch array unit 304 is updated, and the number of the ON-state switches of the switch array unit 304 is changed.

This example causes a delay for two cycles of the clock signal from the comparison of the reference voltage $V_{REF}$ with the output voltage $V_{OUT}$ until the change in the number of the ON-state switches of the switch array unit 304.

FIG. 8 is a diagram illustrating an example of a state of each unit of the power supply circuit of FIG. 6 at each time. That is, FIG. 8 illustrates the output of the comparison circuit 305, the increase/decrease in the number of the switches 303 of the switch array unit 304, and others, at the input time of the clock signal in the power supply circuit of FIG. 6 in consideration of the circuit of FIG. 7.

In FIG. 8, due to the influence of the delay caused by the clock operation of the digital circuit configuring the control unit 309, delay is caused between the time of the comparison of the reference voltage $V_{REF}$ with the output voltage $V_{OUT}$ and the change in the number of the ON-state or OFF-state switches which is a factor for determining the output voltage. Therefore, although one switch is to be ideally increased/decreased, four switches are increased from "m−1" (such as the number "Ns" of the ON-state switches at time $T_{n-5}$) to "m+2" (such as the number "Ns" of the ON-state switches at time $T_{n+2}$) as a range of the number of the increase/decrease in the switches as illustrated in FIG. 8 due to the delay of the control unit 309. Accordingly, an inverse number "1/RS" of the corresponding equivalent resistance RS is changed in a range from $(m-1)/R_{ON}$ to $(m+2)/R_{ON}$, which results in a problem of large oscillation of the output voltage in the steady state.

Further, in the digital circuit, computation of the logic circuit is generally complicated in order to achieve various functions, and a data retention circuit which retains an internal state is also required inside the circuit. In such a case, in propagation of the signal change until it is outputted, a magnitude of the delay is increased by the number of stages of the data retention circuit which is required inside, which results in increase in the number of the increased/decreased switches so as to increase the oscillation of the output voltage.

Moreover, in the digital power supply circuit of the conventional technique, if sizes of the switches of the switch array unit are the same as each other, a change volume of the output resistance changed by the ON/OFF state of one switch is changed by the number of the ON-state switches, and therefore, there is a problem that a magnitude of the oscillation of the output voltage is changed by a magnitude of an output current.

Accordingly, the present invention improves the above-described problems, and a typical preferred aim of the present invention is to provide a power supply circuit in which a magnitude of oscillation of an output voltage is reduced.

The above and other preferred aims and novel characteristics of the present invention will be apparent from the description of the present specification and the accompanying diagrams.

The typical ones of the inventions disclosed in the present application will be briefly described as follows.

(1) A typical power supply circuit has: an input terminal; an output terminal; at least one digital power supply circuit connected between the input terminal and the output terminal; and at least one analog power supply circuit connected in parallel with the at least one digital power supply circuit between the input terminal and the output terminal.

(2) In the above-described item (1), further desirably, the analog power supply circuit is such a circuit that the minimum resistance value of an output equivalent resistance between an input terminal and an output terminal of the analog power supply circuit is an output equivalent resistance equal to or lower than the minimum ON resistance among those of switch circuits which configure a switch array unit of the digital power supply circuit and which have a plurality of ON resistances. Alternatively, the analog power supply circuit having a feature of such a circuit that the minimum resistance value of the output equivalent resistance between the input terminal and the output terminal of the analog power supply circuit is an output equivalent resistance equal to or lower than the minimum resistance value among those of switch circuits which configure the switch array unit of the digital power supply circuit and which have resistances having resistance values connected in series with each other.

(3) In the above-described item (1), further desirably, the digital power supply circuit has a plurality of transistors configuring a plurality of switches connected between an input terminal and an output terminal of the digital power supply circuit. The analog power supply circuit has an output transistor configuring the output equivalent resistance connected between the input terminal and the output terminal of the analog power supply circuit. And, a size of the output transistor of the analog power supply circuit is smaller than a total size obtained by totalizing sizes of the plurality of transistors of the digital power supply circuit.

The effects obtained by typical aspects of the present invention disclosed in the present application will be briefly described below.

That is, by a typical effect, a power supply circuit in which a magnitude of oscillation of an output voltage is reduced can be provided.

BRIEF DESCRIPTIONS OF THE DRAWINGS

FIG. 2 is a diagram illustrating an example of a state of each unit of the power supply circuit of FIG. 1 at each time;

FIG. 3 is a diagram illustrating another example of the state of each unit of the power supply circuit of FIG. 1 at each time;

FIG. 4 is a diagram illustrating an example of a state of each unit of a power supply circuit (FIG. 6) of a conventional technique at each time as a comparison example of FIG. 5;

FIG. 5 is a diagram illustrating still another example of the state of each unit of the power supply circuit of FIG. 1 at each time;

FIG. 8 is a diagram illustrating an example of a state of each unit of the power supply circuit of FIG. 6 at each time.

DESCRIPTIONS OF THE PREFERRED EMBODIMENTS

Figure 1:
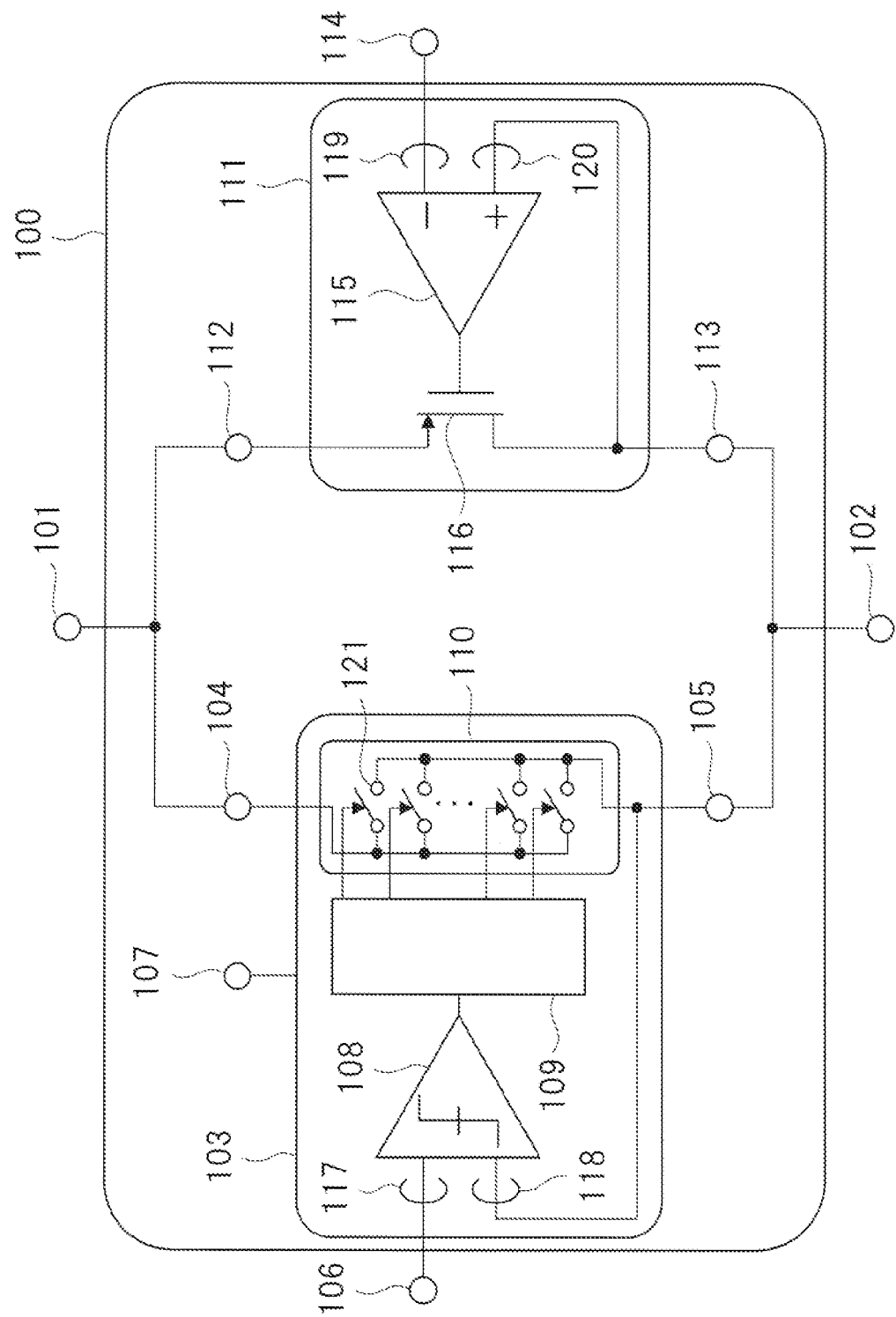
FIG. 1 is a diagram illustrating an example of a configuration of a power supply circuit according to an embodiment of the present invention.

In the embodiments described below, the invention will be described in a plurality of sections or embodiments when required as a matter of convenience. However, these sections or embodiments are not irrelevant to each other unless otherwise stated, and the one relates to the entire or a part of the other as a modification example, details, or a supplementary explanation thereof. Also, in the embodiments described below, when referring to the number of elements (including number of pieces, values, amount, range, and the like), the number of the elements is not limited to a specific number unless otherwise stated or except the case where the number is apparently limited to a specific number in principle. The number larger or smaller than the specified number is also applicable.

Further, in the embodiments described below, it goes without saying that the components (including element steps) are not always indispensable unless otherwise stated or except the case where the components are apparently indispensable in principle. Similarly, in the embodiments described below, when the shape of the components, positional relation thereof, and the like are mentioned, the substantially approximate and similar shapes and the like are included therein unless otherwise stated or except the case where it is conceivable that they are apparently excluded in principle. The same goes for the numerical value and the range described above.

Hereinafter, an embodiment of the present invention will be described in detail based on the accompanying drawings. Note that the same components are denoted by the same reference symbols throughout all drawings for describing the embodiment, and the repetitive description thereof will be omitted.

Embodiment

A power supply circuit according to an embodiment of the present invention will be explained by using FIGS. 1 to 5.

(1) The power supply circuit according to the present embodiment has: an input terminal (101); an output terminal (102); at least one digital power supply circuit (103) connected between the input terminal and the output terminal; and at least one analog power supply circuit (111) connected in parallel with the at least one digital power supply circuit between the input terminal and the output terminal. Hereinafter, an example will be explained so that the numbers of both of the digital power supply circuit and the analog power supply circuit are one. However, it goes without saying that the present invention is also applicable to cases in which the numbers thereof are two or larger.

(2) In the above-described item (1), further desirably, the analog power supply circuit (111) is such a circuit that the minimum resistance value of an output equivalent resistance (116) between an input terminal (112) and an output terminal (113) of the analog power supply circuit is an output equivalent resistance equal to or lower than the minimum ON resistance among those of switch circuits (121) which configure a switch array unit (110) of the digital power supply circuit and which have a plurality of ON resistances. Alternatively, the analog power supply circuit is such a circuit that the minimum resistance value of the output equivalent resistance (116) between the input terminal (112) and the output terminal (113) of the analog power supply circuit is an output equivalent resistance equal to or lower than the minimum resistance value among those of the switch circuits (121) which configure the switch array unit (110) of the digital power supply circuit and which have resistances having resistance values connected in series with each other.

(3) In the above-described item (1), further desirably, the digital power supply circuit (103) has a plurality of transistors configuring a plurality of switches (121) connected between an input terminal (104) and an output terminal (105) of the digital power supply circuit. The analog power supply circuit (111) has an output transistor (116) configuring the output equivalent resistance connected between the input terminal (112) and the output terminal (113) of the analog power supply circuit. And, a size of the output transistor of the analog power supply circuit is smaller than a total size obtained by totalizing sizes of the plurality of transistors of the digital power supply circuit.

A power supply circuit according to the present embodiment having the features as described above will be explained below in detail based on drawings.

<Configuration and Operation of Power Supply Circuit>

First, a configuration and an operation of the power supply circuit according to the present embodiment will be explained by using FIG. 1. FIG. 1 is a diagram illustrating an example of the configuration of the power supply circuit.

The power supply circuit 100 according to the present embodiment is configured of: an input terminal 101; an output terminal 102; a digital power supply circuit 103; a reference voltage terminal 106; a clock terminal 107; an analog power supply circuit 111, and a reference voltage terminal 114.

An input voltage is inputted to the input terminal 101. An output voltage is outputted from the output terminal 102. A reference voltage for the digital power supply circuit 103 is inputted to the reference voltage terminal 106. A clock signal for the digital power supply circuit 103 is inputted to the clock terminal 107. A reference voltage for the analog power supply circuit 111 is inputted to the reference voltage terminal 114.

The above-described digital power supply circuit 103 is configured of: a comparison circuit 108; a control unit 109; a switch array unit 110, and is provided with: a digital-power-supply-circuit input terminal 104; and a digital-power-supply-circuit output terminal 105.

The above-described digital power supply circuit 103 is a digital-operated power supply circuit which controls the output voltage by changing the number of a plurality of ON-state or OFF-state switches 121 connected between the digital-power-supply-circuit input terminal 104 and the digital-power-supply-circuit output terminal 105 by using a clock.

The above-described digital power supply circuit 103 is a technique described in the above-described Patent Document 1. A main feature related to the present invention will be described as follows. For example, each of the switches 121 configuring the switch array unit 110 is a switch having an ON resistance value (r1) in practice. Alternatively, if the ON resistance value (r1) is extremely small, there is a configuration example having a switch circuit having a circuit resistance value (r3=r1+r2) in which resistances having resistance values (r2) connected in series with each other are connected in series with the switch.

Moreover, each of the switches 121 configuring the switch array unit 110 can be specifically achieved by a transistor. For example, if each switch is achieved by a PMOS transistor, the switch array unit 110 is configured by connecting 256 PMOS transistors in parallel with each other, the PMOS transistor having source terminals connected to the digital-power-supply-circuit input terminal 104 and having drain terminals connected to the digital-power-supply-circuit output terminal 105, and control is performed by inputting a switch control signal which is outputted from the control unit 109 to their gate terminals.

Note that other units of the above-described digital power supply circuit 103 are as in the above-described Patent Document 1.

The above-described analog power supply circuit 111 is configured of a differential amplifier circuit 115 and an output transistor 116, and is provided with an analog-power-supply-circuit input terminal 112 and an analog-power-supply-circuit output terminal 113.

The above-described analog power supply circuit is an analog-operated power supply circuit which controls the output voltage by controlling the output transistor 116 which is connected between the analog-power-supply-circuit input terminal 112 and the analog-power-supply-circuit output terminal 113 by using the output signal of the differential amplifier circuit 115 which compares the reference voltage with the output voltage of the analog-power-supply-circuit output terminal 113 and which outputs an analog signal.

In the power supply circuit 100 according to the present embodiment, the digital power supply circuit 103 and the analog power supply circuit 111 are connected in parallel with each other with respect to the input terminal 101 and the output terminal 102 by connecting the digital-power-supply-circuit input terminal 104 and the analog-power-supply-circuit input terminal 112 to the input terminal 101, and connecting the digital-power-supply-circuit output terminal 105 and the analog-power-supply-circuit output terminal 113 to the output terminal 102.

In the configuration of the above-described power supply circuit 100, it is desired that a size of the output transistor 116 which configures an output equivalent resistance connected between the analog-power-supply-circuit input terminal 112 and the analog-power-supply-circuit output terminal 113 is formed so as to be smaller than a total size obtained by totalizing sizes of the transistors of the plurality of switches 121 configuring the switch array unit 110 connected between the digital-power-supply-circuit input terminal 104 and the digital-power-supply-circuit output terminal 105.

In the above-described digital power supply circuit 103, a set of the following operations is executed for each clock signal inputted to the clock terminal 107. The comparison circuit 108 compares a reference voltage 117 which is inputted to the reference voltage terminal 106 with a feedback voltage 118 which is generated from the output voltage generated at the digital-power-supply-circuit output terminal 105, and inputs a result of the comparison to the control unit 109.

The control unit 109 updates a register therein by using the result of the comparison of the comparison circuit 108, and changes the switch control signal which causes the ON state or the OFF state of each of the switches of the switch array unit 110.

In the switch array unit 110, the output voltage can be controlled by changing the number of the ON-state switches by using the switch control signal outputted from the control unit 109. The operation of the digital power supply circuit 103 causes the delay by 2 clocks as similar to the conventional circuit of the digital power supply circuit illustrated in FIG. 6 described above.

On the other hand, in the above-described analog power supply circuit 111, a reference voltage 119 which is inputted to the reference voltage terminal 114 and a feedback voltage 120 which is generated from the output voltage generated at the analog-power-supply-circuit output terminal 113 are inputted to the differential amplifier circuit 115.

The differential amplifier circuit 115 can control the output voltage by inputting a signal corresponding to a difference between the reference voltage 119 and the feedback voltage 120 to a gate terminal of the output transistor 116 so as to equivalently change the resistance between the analog-power-supply-circuit input terminal 112 and the analog-power-supply-circuit output terminal 113. A feedback band of the analog power supply circuit 111 is desired to be a band wider than a frequency of an inverse number of a clock cycle of the digital power supply circuit 103.

In the above-described analog power supply circuit 111, if the switches 121 configuring the switch array unit 110 are switch circuits having the ON resistances, the minimum resistance value of the output equivalent resistance between the analog-power-supply-circuit input terminal 112 and the analog-power-supply-circuit output terminal 113 is controlled to be an output equivalent resistance equal to or lower than the minimum ON resistance among those of the switches 121. Alternatively, if the switches 121 configuring the switch array unit 110 are switch circuits having the resistances having the resistance values connected in series with each other, it is controlled to be the output equivalent resistance equal to or lower than the minimum resistance value among those of the switches 121.

Generally, the above-described feedback voltage 120 ($VA_{OUT}$) has a relation expressed by an Expression (3) when the above-described reference voltage 119 is expressed as "$VA_{REF}$", the output voltage of the analog-power-supply-circuit output terminal 113 is expressed as "$VA_{OUT}$", and a gain obtained by synthesizing a gain of the above-described differential amplifier circuit 115 and a gain of the above-described output transistor 116 is expressed as "$A_T$".

$$VA_{OUT}=(A_T/(1+A_T))VA_{REF} \qquad (3)$$

Normally, it is designed to provide a relation "$A_T \gg 1$", and therefore, the Expression (3) becomes the Expression (4) in the above-described analog power supply circuit 111.

$$VA_{OUT}=VA_{REF} \qquad (4)$$

On the other hand, when the gain of the above-described differential amplifier circuit 115 is sufficiently large so as to satisfy the above-described relation "$A_T \gg 1$", the above-described output transistor 116 is considered as a voltage control variable resistance whose input is the output voltage of the above-described differential amplifier circuit 115. At this time, a relation expressed by Expression (5) is satisfied for the output voltage $VA_{OUT}$ of the above-described analog-power-supply-circuit output terminal 113 when the input voltage of the above-described analog-power-supply-circuit input terminal 112 is expressed as "$VA_{IN}$" in such a case that the equivalent resistance of the above-described output transistor 116 is expressed as "$R_A$" and the resistance of the load connected to the above-described analog-power-supply-circuit output terminal 113 is expressed as "$R_L$", and it is considered that the resistance of the above-described voltage control variable resistance is controlled so that $VA_{OUT}$ is equal to $VA_{REF}$.

$$VA_{OUT}=(R_L/(R_L+R_A))VA_{IN} \qquad (5)$$

Also, the input voltage $V_{IN}$ of the above-described input terminal 101 and the output voltage $V_{OUT}$ of the above-described output terminal 102 have a relation expressed by Expression (6) when the equivalent resistance between the above-described input terminal 101 and the above-described output terminal 102 of the above-described power supply circuit 100 having the above-described digital power supply circuit 103 and the above-described analog power supply circuit 111 connected in parallel with each other is expressed as "$R_T$", and a resistance of a load connected to the above-described output terminal 102 is expressed as "$R_L$".

$$V_{OUT}=(R_L/(R_L+R_T))V_{IN} \qquad (6)$$

The following is explanation for an operation in the steady state provided when a reference voltage $V_{REF}$ expressed by Expression (7) is applied to each of the reference voltage terminal 106 of the above-described digital power supply circuit 103 of the above-described power supply circuit 100 and the reference voltage terminal 114 of the above-described analog power supply circuit 111 thereof. The above-described equivalent resistance in this case is expressed as "$R_T$". Also, an inverse number $1/R_T$ of the above-described equivalent resistance $R_T$ has a relation expressed by Expression (8), and 1/Rc is in a range of Expression (9). A symbol "Rc" of the above-described 1/Rc is a resistance to be a fractional point obtained when the above-described equivalent resistance $R_T$ is expressed.

$$(R_L/(R_L+RS_m))V_{IN} \le V_{REF} < (R_L/(R_L+RS_{m+1}))V_{IN} \qquad (7)$$

$$1/R_T = m/R_{ON} + 1/R_C \qquad (8)$$

$$0 \le 1/R_C < 1/R_{ON} \qquad (9)$$

In order to facilitate the explanation, a change range of the inverse number $1/R_A$ of the equivalent resistance $R_A$ of the above-described output transistor 116 of the above-described analog power supply circuit 111 is expressed by Expression (10).

$$0 \le 1/R_A < 2/R_{ON} \qquad (10)$$

In the above-described digital power supply circuit 103 in the above-described power supply circuit 100, a clock signal having a clock cycle "T" is inputted to the above-described clock terminal 107, and the number of the ON-state switches of the above-described switch array unit 110 is updated at every cycle T, so that the equivalent resistance RS of the above-described switch array unit 110 is updated. On the other hand, in the above-described analog power supply circuit 111, the feedback control is always performed.

<State of Each Unit of Power Supply Circuit at Each Time>

Figure 3:
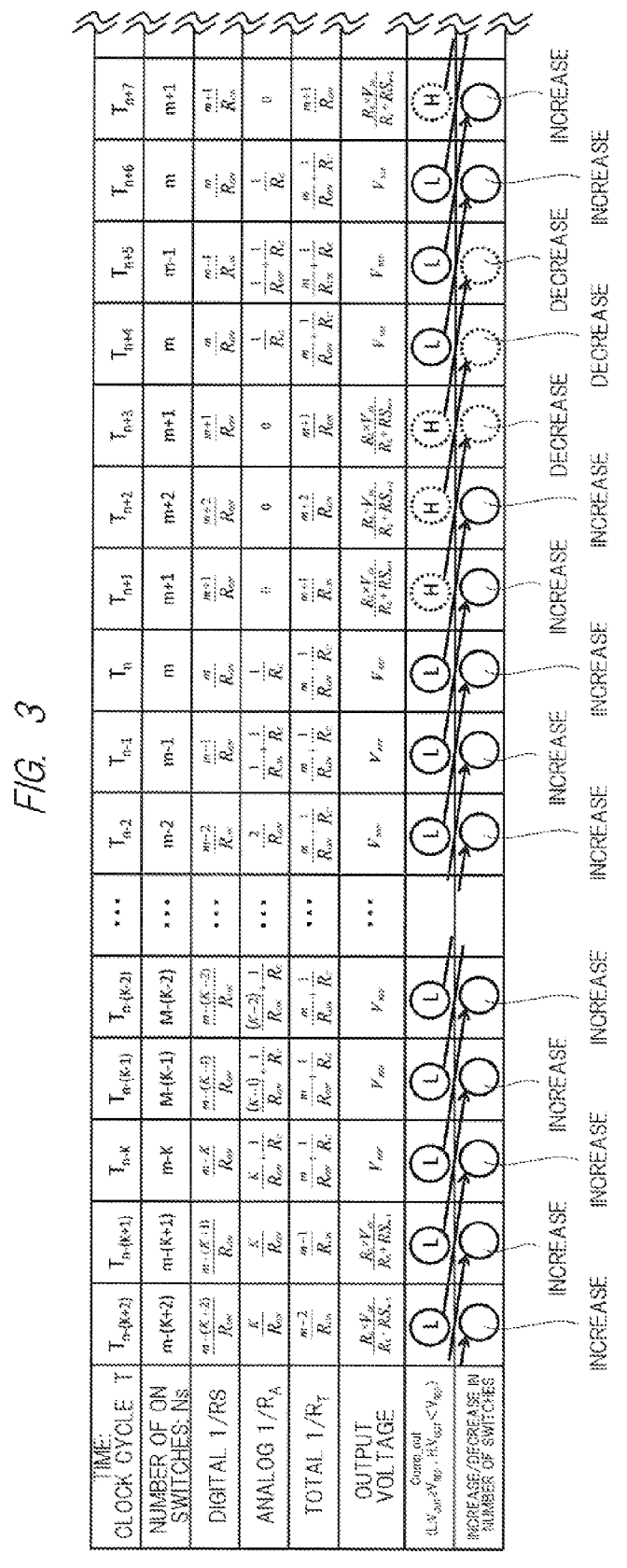

Next, a state of each unit of the power supply circuit according to the present embodiment at each time will be explained with reference to FIGS. 2 to 5. Among FIGS. 2 to 5, each of FIGS. 2, 3, and 5 illustrates an example of the state of each unit of the power supply circuit (FIG. 1) according to the present embodiment at each time, and FIG. 4 illustrates an example of the state of each unit of the power supply circuit (FIG. 6) of the conventional technique at each time.

FIG. 2 illustrates, together with the time (: clock cycle T), the states at each time of the comparison result Comp_out of the above-described comparison circuit 108, the increasing/decreasing operation of the number of the ON-state switches of the above-described switch array unit 110 of the above-described digital power supply circuit 103, the number Ns of the ON-state switches, the inverse number 1/RS of the equivalent resistance RS of the above-described switch array unit 110, the inverse number $1/R_A$ of the equivalent resistance $R_A$ of the above-described output transistor 116 of the above-described analog power supply circuit 111, the inverse number $1/R_T$ of the above-described equivalent resistance $R_T$, and the output voltage in the above-described power supply circuit 100.

In FIG. 2, for example, when the number Ns of the ON-state switches at the time $T_{n+2}$ is "m+2", the inverse number $1/R_T$ of the output resistance $R_T$ is the largest value "(m+2)/$R_{ON}$" because 1/RS is "(m+2)/$R_{ON}$" and $1/R_A$ is 0. The output voltage at this time is "($R_L \times V_{IN}$)/($R_L+RS_{m+2}$)", and the comparison result Comp_out is "H ($V_{OUT} < V_{REF}$)", so that the number of the ON-state switches is decreased. Also, when the number Ns of the ON-state switches at the time $T_{n+4}$ is m, the inverse number $1/R_T$ is the smallest value "m/$R_{ON}$+1/$R_C$" because 1/RS is "m/$R_{ON}$" and $1/R_A$ is "1/$R_c$". The output voltage at this time is $V_{REF}$, and the comparison result Comp_out is "L ($V_{OUT} \ge V_{REF}$)", so that the number of the ON-state switches is increased. The state at the other time is as illustrated in FIG. 2.

Figure 6:
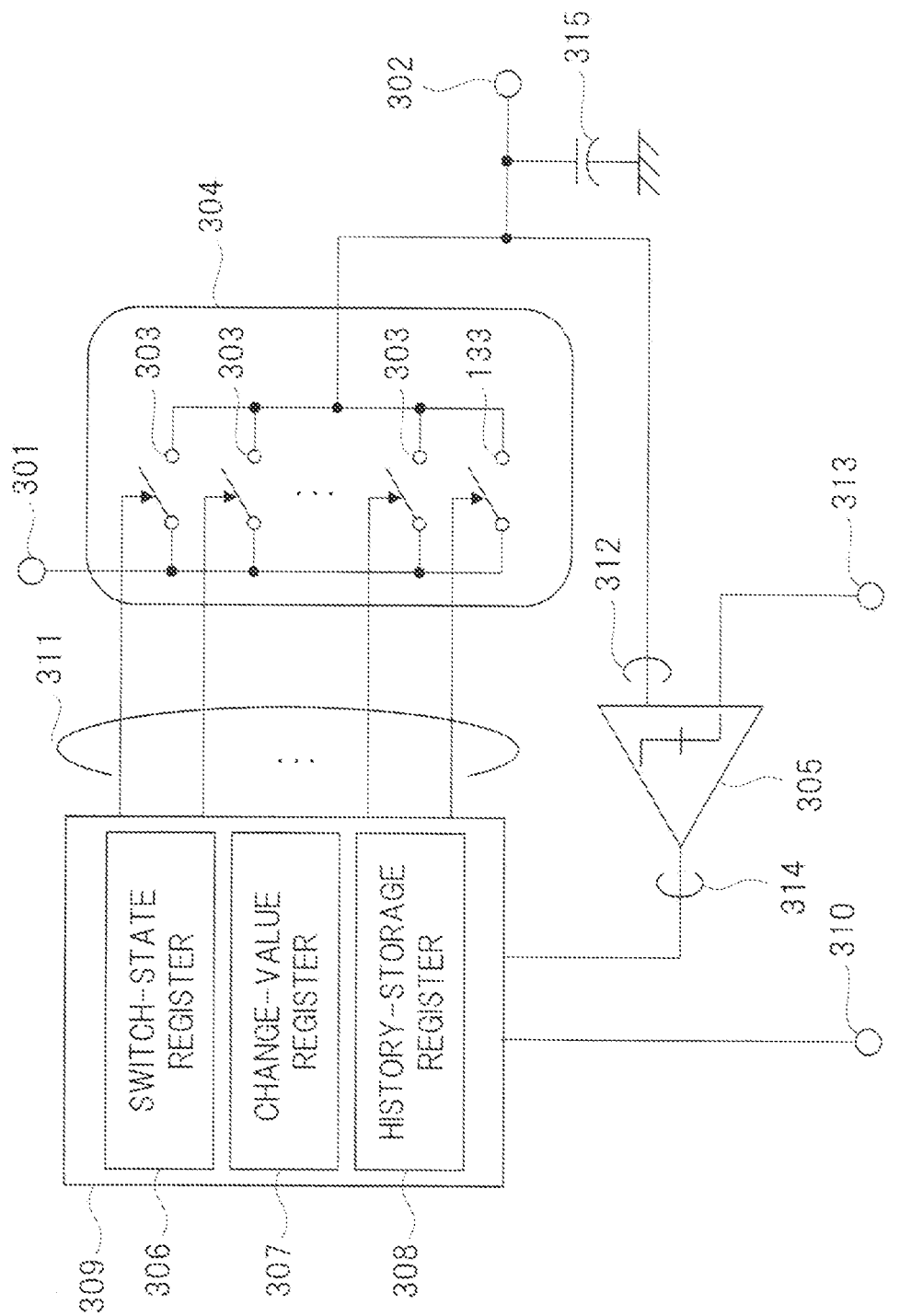
FIG. 6 is a diagram illustrating an example of a configuration of a power supply circuit of a conventional technique.
Figure 7:
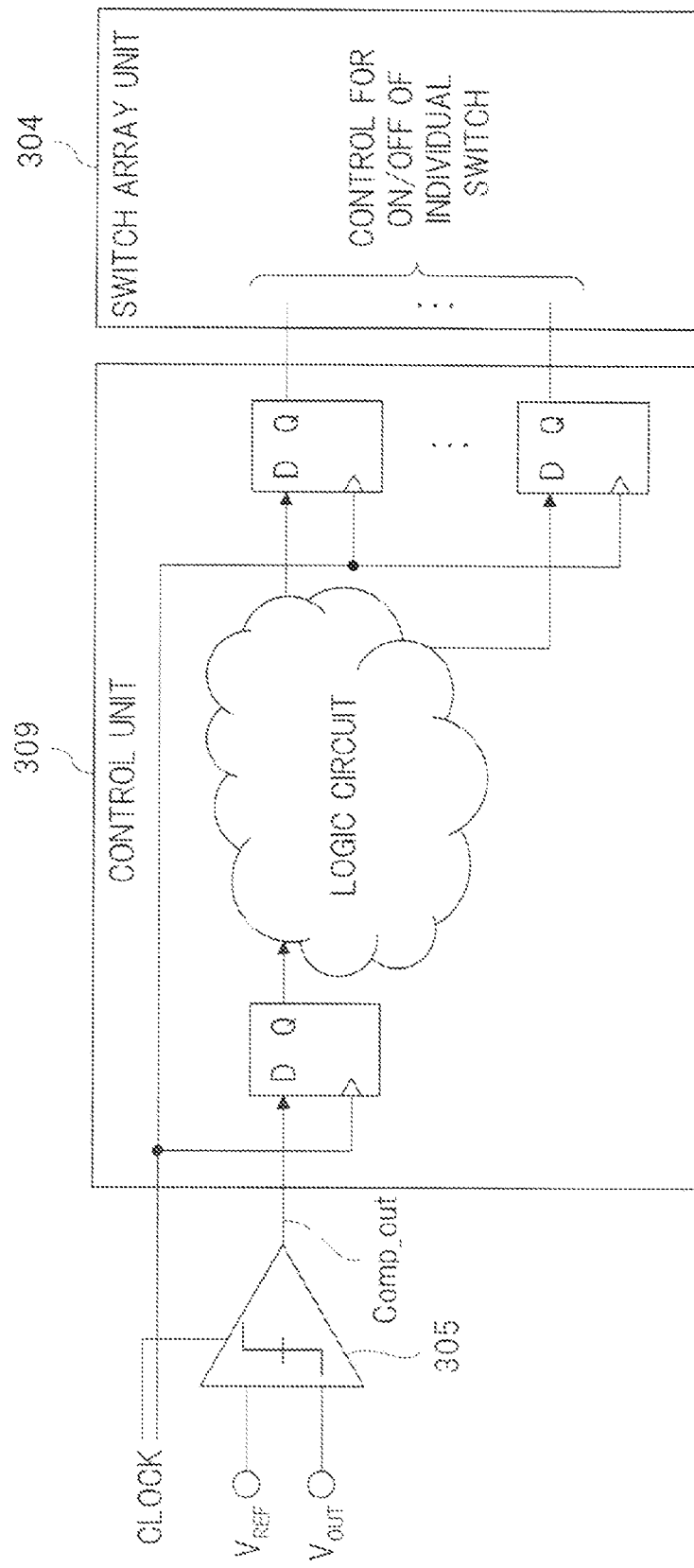
FIG. 7 is a diagram illustrating an example of a general digital circuit in the power supply circuit of FIG. 6.

As described above, in the states of FIG. 2, the inverse number $1/R_T$ of the output resistance $R_T$ is in a range of Expression (11) whose range is smaller than the change range from "(m−1)/$R_{ON}$" to "(m+2)/$R_{ON}$" of the inverse number of the output resistance of the conventional circuit of the digital power supply circuit illustrated in FIG. 6 described above. In this manner, the oscillation of the output voltage in the steady state can be reduced.

$$m/R_{ON}+1/R_C \le 1/R_T \le (m+2)/R_{ON} \qquad (11)$$

In the above-described Expression (10), the range of the inverse number $1/R_A$ of the equivalent resistance $R_A$ of the above-described output transistor 116 of the above-described analog power supply circuit 111 is limited. Meanwhile, a case in a range of the following Expression (12) is illustrated in FIG. 3. Note that "K" is 2 or larger.

$$0 \le 1/R_A < K/R_{ON} \qquad (12)$$

As illustrated in FIG. 3, the Expression (11) is established even when K is an arbitrary number of 2 or larger, and the change range of the inverse number $1/R_T$ of the output resistance $R_T$ is from "m/$R_{ON}$+1/Rc (for example, at the time $T_{n+4}$)" to "(m+2)/$R_{ON}$ (for example, at the time $T_{n+2}$)", the change range being smaller than the change range of the inverse number of the output resistance of the conventional circuit (FIG. 6), so that the oscillation of the output voltage is decreased. In this manner, it can be understood that even the large delay of the control unit 109 can be supported by increasing the value K. In this manner, for example, when the power supply circuit is activated, such a complex control as appropriately setting the state of the number of the switches for the number of the ON-state or the OFF-state switches can be achieved.

FIG. 4 is a diagram illustrating the state of the conventional circuit (FIG. 6) obtained when the delay is caused for one cycle of the clock. Even when the delay is for one cycle, the inverse number 1/RS of the equivalent resistance RS of the switch array unit 110 is changed from m/$R_{ON}$ (for example, at time $T_n$) to (m+1)/$R_{ON}$ (for example, at the time $T_{n+1}$). On the other hand, FIG. 5 is a diagram illustrating the state of the circuit of the present invention (FIG. 1) at each time obtained when the inverse number $1/R_A$ of the equivalent resistance $R_A$ of the above-described output transistor 116 is in the range of Expression (12). At this time, FIG. 5 is satisfied even with "K=1". The change of the inverse number $1/R_T$ of the output resistance $R_T$ at this time is expressed by Expression (13) so that the change of the inverse number $1/R_T$ of the equivalent output resistance $R_T$ is similarly reduced to be in the range from "m/$R_{ON}$+1/$R_c$ (for example, at the time $T_n$)" to "(m+1)/$R_{ON}$ (for example, at the time $T_{n+1}$)". In this manner, an effect of reducing the oscillation of the output voltage is provided.

$$m/R_{ON}+1/R_C \le 1/R_T \le (m+1)/R_{ON} \qquad (13)$$

As described above, it can be understood that at least a relation of Expression (14) is established between a delay number "D" caused by the clock and the value K of the Expression (12).

$$D \le K \qquad (14)$$

Therefore, in the configuration in which the digital power supply circuit 103 and the analog power supply circuit 111 are connected in parallel with each other between the input terminal 101 and the output terminal 102, the power supply circuit 100 in having the reduction in the oscillation amount of the output voltage can be achieved by satisfying the relation of the Expression (14).

Effect of Present Embodiment

According to the power supply circuit 100 according to the present embodiment explained above, the digital power supply circuit 103 and the analog power supply circuit 111 are connected in parallel with each other between the input terminal 101 and the output terminal 102, so that the oscillation of the output voltage generated by the delay of the control unit 109 of the digital power supply circuit 103 can be corrected by the analog power supply circuit 111. In this manner, the power supply circuit 100 having the reduction in the oscillation amount of the output voltage can be provided.

In other words, the equivalent resistance of the output can be always controlled so as to reduce the oscillation of the output voltage in the steady state by connecting the analog power supply circuit 111 to the digital power supply circuit 103 in parallel with each other, the analog power supply circuit 111 controlling the output voltage by controlling the output transistor 116 connected between the input terminal 101 and the output terminal 102 by using the output signal of the differential amplifier circuit 115 which outputs the analog signal by comparing the reference voltage 119 with the feedback voltage 120, and the digital power supply circuit 103 controlling the output voltage by changing the number of the plurality of ON-state or OFF-state switches 121 of the switch array unit 110 connected between the input terminal 101 and the output terminal 102 by using the clock.

The effect as the above-described power supply circuit 100 can be achieved by such an analog power supply circuit 111 that the minimum resistance value of the output equivalent resistance between the analog-power-supply-circuit input terminal 112 and the analog-power-supply-circuit output terminal 113 is the output equivalent resistance equal to or lower than the minimum ON resistance among those of the plurality of switches 121 which have the ON resistances and which configure the switch array unit 110 of the digital power supply circuit 103. Alternatively, the effect can be achieved by such an analog power supply circuit 111 that the minimum resistance value of the output equivalent resistance between the analog-power-supply-circuit input terminal 112 and the analog-power-supply-circuit output terminal 113 is the output equivalent resistance equal to or lower than the minimum resistance value among those of the switches 121 which configure the switch array unit 110 of the digital power supply circuit 103 and which have the resistances having the resistance values connected in series with each other.

Moreover, from another point of view, while utilizing an advantage of the digital operation, a problem of the digital operation can be supplemented by the analog operation of the analog power supply circuit 111 having the minimum size by connecting the analog power supply circuit 111 including the output transistor 116 having the function of the voltage control variable resistance in parallel with the digital power supply circuit 103 capable of reducing the power consumption in operation of the circuit by reducing the voltage of the power supply voltage and the operating speed. In this manner, such a power supply circuit 100 that the voltage and the power consumption can be reduced while suppressing the increase in the dimension can be achieved.

The effect of the above-described power supply circuit 100 from another point of view can be achieved by forming the size of the output transistor 116 of the analog power supply circuit 111 so as to be smaller than the total size obtained by totalizing the sizes of the transistors of the plurality of switches 121 configuring the switch array unit 110 of the digital power supply circuit 103.

In the foregoing, the invention made by the present inventor has been concretely described based on the embodiment. However, it is needless to say that the present invention is not limited to the foregoing embodiment and various modifications and alterations can be made within the scope of the present invention.

What is claimed is:

1. A power supply circuit, comprising:
an input terminal for inputting an input voltage;
an output terminal for outputting an output voltage;
a first reference voltage terminal and a second reference voltage terminal for inputting a reference voltage;
a clock signal terminal for inputting a digital clock signal;
a digital power supply circuit, connected to the first reference voltage terminal, the clock signal terminal, the input terminal and the output terminal, including:
  a control unit coupled to the clock signal terminal,
  a comparison circuit, coupled to the first reference voltage terminal and the output terminal, having an output coupled to the control unit, and
  a switch array unit, coupled to the control unit, the input terminal and the output terminal, having a plurality of switches, each switch having an OFF-state, an ON-state and an ON-resistance; and
an analog power supply circuit, connected to the second reference voltage terminal, and, in parallel with the digital power supply circuit, the input terminal and the output terminal, including:
  an output transistor providing a voltage-controlled equivalent resistance, coupled to the input terminal and the output terminal, having a gate terminal, and
  a differential amplifier, coupled to the second reference voltage terminal and the output terminal, having an output coupled to the gate terminal of the output transistor,
wherein the digital power supply circuit controls the output voltage by changing a number of switches in the ON-state,
wherein the analog power supply circuit controls the output voltage by changing the equivalent resistance of the output transistor,
wherein a minimum equivalent resistance of the output transistor is equal to or lower than a minimum ON-resistance of the plurality of switches, and
wherein a magnitude of an oscillation of the output voltage, generated by a delay of the control unit of the digital power supply circuit when changing the number of switches in the ON-state, is reduced by the analog power supply circuit.

2. The power supply circuit according to claim 1, wherein the digital power supply circuit is operated at every clock signal,
the control unit updates a register therein based on the output of the comparison circuit, and changes a switch control signal for providing the ON state or the OFF state for each of the switches of the switch array unit, and
the switch array unit changes the number of the ON-state switches based on the switch control signal from the control unit.

3. The power supply circuit according to claim 1, wherein the plurality of switches of the digital power supply circuit are a plurality of transistors, and
a size of the output transistor of the analog power supply circuit is smaller than a total size obtained by totalizing sizes of the plurality of transistors of the digital power supply circuit.

* * * * *